United States Patent [19]
Fälldin et al.

[11] Patent Number: 5,663,636
[45] Date of Patent: Sep. 2, 1997

[54] METHOD FOR REDUCING WAVEFORM DISTORTION IN AN ELECTRICAL UTILITY SYSTEM AND CIRCUIT FOR AN ELECTRICAL UTILITY SYSTEM

[75] Inventors: Agne Fälldin, Sundsvall, Sweden; Esko Kiiskinen, Vaasa, Finland

[73] Assignee: ABB Stromberg Kojeet Oy, Vaasa, Finland

[21] Appl. No.: 453,057

[22] Filed: May 26, 1995

Related U.S. Application Data

[63] Continuation-in-part of Ser. No. 432,940, May 1, 1995.

[30] Foreign Application Priority Data

May 26, 1994 [FI] Finland .................. 942447

[51] Int. Cl.⁶ ............................................. H01F 30/12
[52] U.S. Cl. ............................... 323/361; 323/356
[58] Field of Search .............................. 323/356, 361; 307/66, 105; 363/40, 98, 71

[56] References Cited

U.S. PATENT DOCUMENTS

| | | | |
|---|---|---|---|
| 3,794,938 | 2/1974 | Boelter | 333/70 R |
| 4,257,007 | 3/1981 | Brooks et al. | 328/167 |

*Primary Examiner*—Peter S. Wong
*Assistant Examiner*—Raj Patel

[57] ABSTRACT

The invention relates to an interference suppression method and circuit for an electrical system, said electrical system comprising a main transformer (2) with a star point (12), phase leg conductors (L1, L2, L3) connected to the transformer (2), a neutral conductor (N) connected to the earth potential (3) and to the star point (12) of the transformer (2), and loads (5) connected between the phase leg conductors (L1, L2, L3) and the neutral conductor (N), said loads being connected to the neutral conductor (N) at connection points (4). In accordance with the invention a bandstop filter (1) tuned at a center frequency 3*f is connected between the star point (12) of the transformer (2) and the connection points (4) of the loads (5).

12 Claims, 2 Drawing Sheets

METHOD FOR REDUCING WAVEFORM DISTORTION IN AN ELECTRICAL UTILITY SYSTEM AND CIRCUIT FOR AN ELECTRICAL UTILITY SYSTEM This application is a continuation-in-part of our copending application Ser. No. 08/432,940, filed May 1, 1995, entitled "Method For Reducing Waveform Distortion In An Electrical Utility System And Circuit For An Electrical Utility System".

The invention relates to a method for reducing waveform distortion.

The invention also concerns a circuit for use in an electrical utility system.

Nonlinear loads which do not have a sinewave input current waveform but which rather steal a current pulse with steep leading and trailing edges, generate harmonic distortion on the voltage waveform of an electrical system. Such consumers are, e.g., miniature fluorescent lamps equipped with an electronic ballast: these lamps consume a current pulse of only 1.5 ms duration at the top of the 50 Hz voltage halfwave. Moreover, in a modern office environment the electrical system may be comprehensively loaded by problematic consumers of equally low quality including computers, copiers, printers and air-conditioning equipment with electronic speed control. The dominating overtone component, namely the third harmonic, caused by such loads is summed almost arithmetically on the neutral conductor of the electrical system. In practice, almost two-fold currents have been measured on the neutral conductor with respect to the current of the phase legs. Conventionally, the neutral conductor has no overload protection, and with the steady increase of electric, energy consumption, a hazard Situation is imminent. Furthermore, the third harmonic of the mains frequency has been identified as a source of interference with computer equipment and communications facilities.

It is an object of the present invention to overcome the shortcomings of the above-described technology and to achieve an entirely novel method of electrical interference reduction for electrical utility networks and a filtering circuit for use in an electrical utility network.

The invention is based on placing a bandstop filter between the star point of the main transformer and the connection points of the loads, whereby the center frequency of the filter is tuned at the third harmonic of the mains frequency.

The invention offers significant benefits.

The method according to the invention is capable of preventing neutral conductor overloading, and furthermore, magnetic fields caused by currents in the neutral conductor can be essentially reduced. Additionally, interference with communications and computer equipment is reduced. Also power losses caused by the third harmonic component can be effectively reduced. By virtue of using a saturable magnetic steel circuit, the impedance of the filter can be made extremely low for short-circuit currents.

BRIEF DESCRIPTION OF THE DRAWINGS

In the following, the invention will be examined in more detail by means of exemplifying embodiments with reference to the attached drawings, in which.

DETAILED DESCRIPTION OF THE PREFERRED EMBODIMENTS

Figure 1:
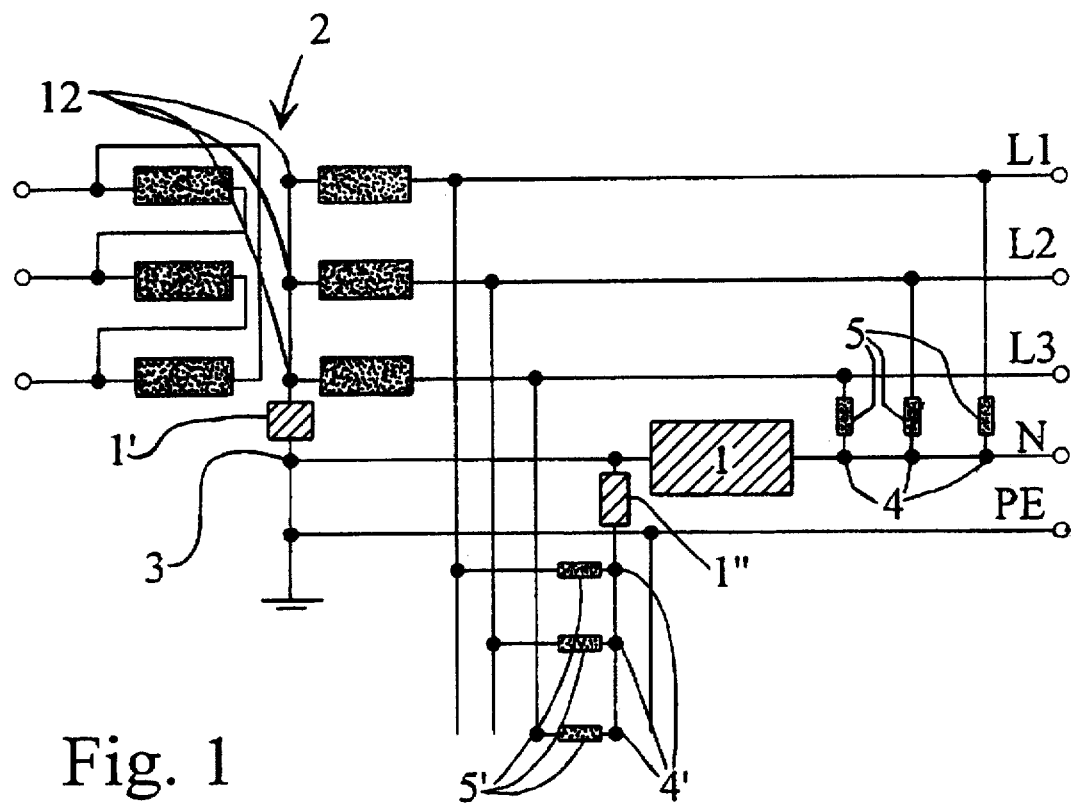
FIG. 1 is a basic diagram of an electrical circuit according to the invention.

With reference to FIG. 1, an electrical utility system TN-S comprises a main transformer 2 with a star point 12, phase leg conductors L1, L2 and L3, a neutral conductor N and a protective earth conductor PE. Electric energy is transferred in an electrical system using alternating current at a frequency $f_0$ which typically is 50 Hz in Europe and 60 Hz on the North American continent. Loads 5 and 5' are connected between the phase leg conductors L1–L3 and the neutral conductor N. The loads 5 and 5' are connected to the neutral conductor N at connection points 4 and 4'. The neutral conductor N is further connected to the actual earth potential at an earthing point 3. According to the invention, a bandstop filter 1, 1' or 1" tuned to filter away the third harmonic of the mains frequency ($3*f_0$) is connected to the neutral conductor N between the connection point 4 (or 4') of the load 5 (or 5') and the actual earth potential 3, or between transformer star point 12 and neutral conductor N.

Figure 2:
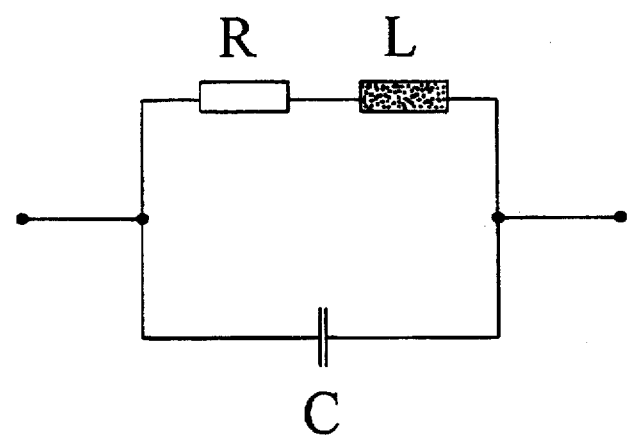
FIG. 2 is the circuit diagram of a filter embodiment employed in the method according to the invention.

With reference to FIG. 2, the filter is typically formed by a series-parallel connected circuit tuned to the third harmonic of the mains frequency comprising series-connected inductance and resistance R in parallel with capacitance C. As mentioned above, the filter resonant frequency is $3*f_0$, which is 150 Hz in Europe and 180 Hz in the USA, respectively. If the resistance R is small, the resonant frequency of the filter is approximately determined by the equation $$1 - \omega^2 LC = 0$$

where in a 50 Hz network $\omega = 2\pi*150$ (1/s). According to the invention, the inductor can have either an air-core, magnetic-steel core or ferrite core structure. The air gap of a magnetic-steel or ferrite core is dimensioned so as to avoid saturation of the core material at a neutral conductor current of twice the nominal phase leg current. The inductance L is advantageously formed by a number of small, parallel-connected, magnetic steel core inductors. Here, the total current-carrying cross section of the conductors of the parallel-connected inductors must be at least equal to the cross section of the neutral conductor. The impedance S of the filter is $$Z = \frac{R \cdot (1 - \omega^2 LC \cdot k) + j\omega L\left(1 + \frac{T}{T_L}\right)}{1 - \omega^2 LC + \frac{R - \omega^2 LCR_s}{R_F} + j\omega T\left(1 + k + \frac{a}{T} + \frac{R_S}{R_F}\right)}$$

in which $$k = \frac{R_S}{R}, \; a = \frac{L}{R_F}, \; T = RC, \; T_L = \frac{L}{R_S},$$

$R_F$ represents iron core losses

The eddy current losses of the inductor core increase proportional to the square of the magnetic flux frequency. To keep the Q-value of the inductor sufficiently high, the core must be made either from a ferrite material or laminated from special-grade, low-loss "electrical" sheet steel.

Figure 3:
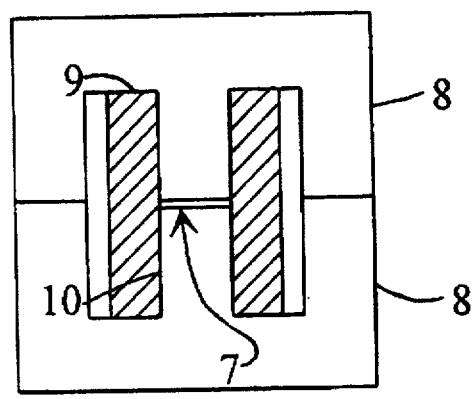
FIG. 3 is a side view of an inductor structure suited for implementing the inductance of FIG. 2.

With reference to FIG. 3, a typical embodiment of the inductor L for the circuit of FIG. 2 is shown. The cross section of the neutral conductor is assumed to be 35 mm² for $I_n$=125 A. The capacitance of the capacitor C is selected as 2.64 mF. Then, the filter circuit can be tuned to resonance at 150 Hz using an inductor L with an inductance of 0.426 mH. In practice, the width $l_0$ of the air gap 7 and the cross section $A_{Fe}$ of the magnetic circuit center leg 10 determine the first approximation of the inductance of one inductor of the filter according to the equation $$L \simeq \mu_0 N^2 \frac{A_{Fe}}{l_0}$$

where N is the number of turns in the inductor winding and $\mu_0$ is the permeability of vacuum (1.256 µH/m).

In this case the air gap $l_0$ has a value of 7.6 mm when the number of turns N is 116 and the cross section of the inductor center leg 10 is 10.9 cm².

In the inductor assembly, the E-shaped magnetic steel core laminations 8 are trimmed such that the center legs are shorter by half the air gap, that is, $l_0/2$=3.8 mm. Hence, when two identical laminated stacks 8 are juxtaposed, the total air gap 7 will be 7.6 mm as desired.

A winding of 116 turns is wound about the center leg 10 using copper wire of dia. 3.0 mm. To make the total cross section of the winding conductors more than 35 mm², i.e. more than the cross section of the neutral conductor, e.g., ten inductor windings can be connected in parallel. The winding form 9 is compressed between the laminated core halves 8 during the assembly of the inductor.

Figure 4:
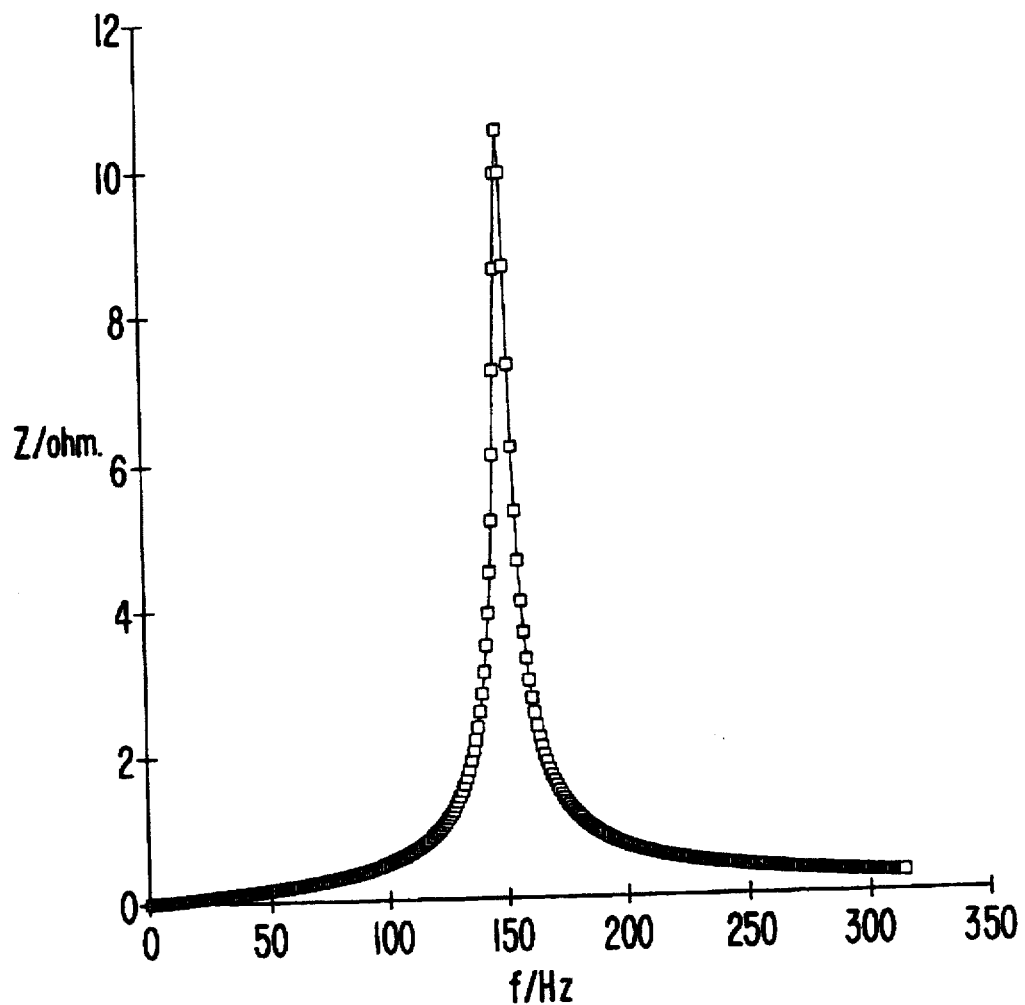
FIG. 4 is a graph illustrating the impedance vs. frequency characteristic of a filter configuration corresponding to that shown in FIG. 2.

With reference to FIG. 4, the filter impedance reaches its maximum value of 10 ohm at the 150 Hz center frequency and the filter impedance falls below 0.15 ohm at 50 Hz.

Next, the magnetic circuit must be checked not to saturate at the current level of 250 A in the neutral conductor N of a 50 Hz electrical system. Then, the current through each winding of a single inductor is I=¹⁄₁₀ * 250 A=25 A.

The peak value of the magnetic flux and the magnetic induction is computed $$U = N\Phi = N \cdot \frac{\hat{b}}{\sqrt{2}} \cdot A_{Fe}$$

$$\hat{b} = \frac{4.26 \cdot 25 \cdot \sqrt{2} \cdot 10^{-3} Vs}{116 \cdot 10.34 \cdot 10^{-4} m^2} = 1.26T$$

If the magnetic core of the inductor of filter 1 is driven to saturation, harmonics will be generated in the electrical system.

In the following the saturation of the magnetic circuit is checked with computer loads, which can exceed 40 V at the third harmonic (e.g. 150 Hz).

$$U = N\omega \frac{\hat{b}}{\sqrt{2}} A_{Fe}$$

$$\hat{b}(150Hz) = \frac{40 \sqrt{2} \ V}{116 \cdot 300\pi \frac{1}{s} \cdot 10.34 \cdot 10^{-4} m^2} = 0.50T$$

The arithmetic sum of the the 50 Hz (or 60 Hz) induction and 150 Hz (or 180 Hz) induction has an effect on the saturation of the magnetic core.

However, the saturation of the magnetic core at short-circuit current levels has the benefit that the reactance of the filter is reduced to a fraction of its normal value approaching that of an air-core inductor. Then, the fuse protection of the system is quickly tripped in the short-circuit situation, whereby harmonics generated on the neutral conductor N during a period of less than a second cause no harm in the system.

A 50 Hz unbalanced current flowing through the third harmonic filter in accordance with the invention causes a movement of the zero point of phase voltages. The filter should be dimensioned such that this movement of the zero point is less than 8% of the phase voltage. In other words the inductance of the filter should be dimensioned at 50 Hz below a certain value. This rule can be presented as an equation:

$$L_{max} = \frac{0.08 \cdot \frac{8}{9} U_n}{\sqrt{3} \cdot 100\pi \cdot I_N}$$

Further, the third harmonic filter in accordance with the invention should be dimensioned such that the product of the current in the neutral conductor and the impedance of the filter at 150 Hz are at least equal to the total interference voltage at 150 Hz.

We claim:

1. An interference suppression method for an electrical system, comprising the steps of providing a main transformer with a star point, phase leg conductors connected to the transformer and a neutral conductor which at its one end is connected to earth potential and the star point of the transformer and at its other end to loads, in which electrical system electric energy is transferred at a frequency f, and providing a bandstop filter tuned at a center frequency 3*f connected between the star point of the transformer and the connection points of the loads.

2. A method as defined in claim 1, wherein the bandstop filter tuned at a center frequency 3*f is connected between the earth potential connection point of the neutral conductor and the connection points of the loads.

3. A method as defined in claim 1, wherein the bandstop filter is formed by a parallel-resonant circuit.

4. A method as defined in claim 3, wherein an inductance of said parallel-resonant circuit is formed by an inductor with a magnetic steel or ferrite core whose air gap is dimensioned so as to avoid saturation of the inductor magnetic circuit at a 50 hz current in the neutral conductor twice the nominal phase leg current when at the same time there is a third harmonic voltage over the filter.

5. An electrical circuit for producing a signal at a frequency, f, comprising.

a transformer with a star point;

a plurality of phase leg conductors connected to outputs of said transformer;

a neutral conductor connected to earth potential and to the star point of said transformer;

at least one load connected between at least one of said phase leg conductors and said neutral conductor, said at least one load being connected to said neutral conductor at a connection point; and a bandstop filter tuned at a center frequency 3*f connected between the star point of said transformer and the connection point.

6. A circuit as defined in claim 5, wherein said bandstop filter is connected between the earth potential connection point of said neutral conductor and the connection point of said at least one load.

7. A circuit as defined in claim 5, wherein said bandstop filter is formed by a parallel-resonant circuit.

8. A circuit as defined in claim 7, wherein an inductance of said parallel-resonant circuit includes an inductor with a magnetic steel or ferrite core whose air gap is dimensioned so as to avoid saturation of the inductor magnetic circuit at a current in said neutral conductor twice a nominal phase leg current when at the same time there is a third harmonic voltage over the filter.

9. A circuit as defined in claim 8, wherein the third harmonic voltage is at least 40 volts.

10. A circuit as defined in claim 5, wherein the frequency, f, is approximately 60 Hz.

11. A circuit as defined in claim 5, wherein said neutral conductor is connected to the star point through said band-stop filter.

12. A circuit as defined in claim 1, wherein the frequency, f, is approximately 60 Hz.

* * * * *